(12) United States Patent
Dougan

(10) Patent No.: US 7,926,657 B1
(45) Date of Patent: Apr. 19, 2011

(54) METHOD AND APPARATUS OF MATING BOXES DISPLAYING A SYMBOL

(76) Inventor: David Dougan, Media, PA (US)

( * ) Notice: Subject to any disclaimer, the term of this patent is extended or adjusted under 35 U.S.C. 154(b) by 0 days.

(21) Appl. No.: 12/760,962

(22) Filed: Apr. 15, 2010

(51) Int. Cl.
*G09B 25/00* (2006.01)

(52) U.S. Cl. ..................................... 206/459.5; 434/403

(58) Field of Classification Search ............... 206/459.5, 206/534, 457; 273/459; 434/365, 403
See application file for complete search history.

(56) References Cited

U.S. PATENT DOCUMENTS

| | | | |
|---|---|---|---|
| 1,597,566 A * | 8/1926 | Bailey | 206/551 |
| 2,111,884 A * | 3/1938 | Cahaney | 220/804 |
| 3,335,846 A * | 8/1967 | Mills | 206/551 |
| 3,547,303 A | 12/1970 | Mascia | |
| 3,780,856 A * | 12/1973 | Braverman | 206/534 |
| 4,139,114 A | 2/1979 | Long | |
| 4,339,041 A * | 7/1982 | Roberts et al. | 229/222 |
| 4,749,085 A * | 6/1988 | Denney | 206/534 |
| 5,115,916 A * | 5/1992 | Beasley et al. | 206/581 |
| 5,156,296 A | 10/1992 | Vasquez | |
| 5,381,916 A * | 1/1995 | Strawder | 220/23.4 |
| 5,558,229 A * | 9/1996 | Halbich | 206/534 |
| 5,735,422 A | 4/1998 | Binter | |
| 5,873,762 A * | 2/1999 | de Chazal | 446/75 |
| D421,903 S | 3/2000 | Craker | |
| 6,085,908 A * | 7/2000 | Lento | 206/581 |
| 6,123,214 A | 9/2000 | Goebel | |
| 6,186,349 B1 * | 2/2001 | Tempongko | 220/4.22 |
| D454,280 S | 3/2002 | Baussan | |
| 6,382,452 B1 | 5/2002 | Getachew | |
| D514,953 S | 2/2006 | Akopyan | |
| 2009/0166243 A1 * | 7/2009 | Cetera | 206/528 |

* cited by examiner

*Primary Examiner* — Jacob K Ackun, Jr.
(74) *Attorney, Agent, or Firm* — Robert J. Yarbrough; Lipton, Weinberger & Husick

(57) ABSTRACT

Each of a plurality of boxes has at least one side that is configured to matably engage a corresponding side of at least one other of the plurality of boxes. The plurality of boxes each has a top that bears indicia. When the sides of the boxes are in matable engagement, the indicia appearing on the tops of the boxes cooperate to form an image. The image forms a symbol, such as a religious or patriotic symbol. To celebrate an event, memorabilia are placed in the interior volume of each of the boxes and the boxes placed in matable engagement, forming the symbol. After a ceremony commemorating the event, the plurality of boxes is separated and each box provided to a one of a plurality of persons.

12 Claims, 18 Drawing Sheets

METHOD AND APPARATUS OF MATING BOXES DISPLAYING A SYMBOL

BACKGROUND OF THE INVENTION

A. Field of the Invention

The Invention relates to multi-part boxes for holding items related to a loved one or to memorialize an event. The boxes bear indicia on a top surface so that when the boxes are joined in a pre-determined orientation, the indicia of the combined boxes cooperate to create a single pre-determined image. The image is a symbol. The Invention is also a method for using the multi-part boxes.

B. Description of the Related Art

Containers having multiple compartments are known in the prior art. The Invention is not taught by the prior art.

II. BRIEF DESCRIPTION OF INVENTION

The invention comprises a plurality of boxes. For the purposes of this document, the term 'plurality' means two or more boxes. The plurality of boxes may be any number of boxes, so long as that number is greater than one. Each of the two or more boxes defines a bottom surface configured to support the box on a surface, such as a table. Each of the boxes includes sides and a top. The top may be removable or hinged to gain access to the interior volume of the box. One or more sides of each box is configured to matably engage one or more sides of at least one of the other boxes. When the mating sides of the two or more boxes are matably engaged, the two or more boxes in combination form a geometric solid. The geometric solid is bilaterally symmetrical.

The top of each box includes indicia that are visible when an observer views the top of the box from above. The indicia may be carved, inlaid, printed, painted, drawn, burned, applied as a decal, or may be any other indicia that may be visible to an observer. When the mating sides of the two or more boxes are matably engaged, the indicia appearing on the tops of the two or more boxes cooperate to form an image. The image formed by the indicia of the two or more boxes is a composite of the indicia appearing on each of the tops of the two or more boxes. The image is complete when all of the two or more boxes forming the geometric solid are matably engaged. The image is incomplete when any one of the two or more boxes is not matably engaged with the others of the two or more boxes.

The image is a symbol. As used in this document, the term 'symbol' means an image that stands for something else by reason of relationship, association or convention. The symbol may be a text, such as one or more words, names or numbers. The symbol may be a religious symbol. As used in this document, the term 'religious symbol' means a Christian cross of any denomination, a Star of David, a Ying and Yan, a star and crescent, or any other symbol indicating a religious belief system by reason of relationship, association or convention linking the symbol with the religious belief system. The symbol may be a religious image, such as an image of a person engaged in religious observance, an image of a deity or a person of religious significance. The symbol may be an organization symbol, such as a trademark or logo. The symbol may be a military or uniformed service symbol, such as the Marine Corps globe and anchor, the crossed anchors symbol of the Coast Guard, the fouled anchor of the U.S. Navy, the star of the U.S. Army, the winged star of the U.S. Air Force, or a military branch insignia or plaque of a subdivision of the Army, Navy, Marine Corps, Air Force or Coast Guard, or such as a symbol of a police or a fire department. The symbol may be a representation of a flag, such as a national flag, a flag of an organization, or a flag of a military or government branch such as the army, navy, marine corps, air force, coast guard, a police or a fire department. The symbol may be a symbol of a political affiliation or point of view, such as a peace symbol or dove.

The image is complete and the symbol formed when all of the two or more boxes forming the geometric solid are matably engaged. The image is incomplete and the symbol is not formed when any one of the two or more boxes is not matably engaged with the others of the two or more boxes.

The method of the invention relates to the observance of an event. The event may be a life event, such as a birth, graduation, wedding or death. The event may be a professional event, such as a promotion or retirement. The event may be any event that a person wishes to observe or celebrate. To celebrate an event using the method of the invention, the plurality of boxes of the invention, as described above, is provided. The number of boxes in the plurality of boxes is selected to correspond to a number of persons. Items of memorabilia related to the event are placed in each box. For example, where the event is the death of a person, memorabilia relating to the deceased person are placed in each box. The boxes are placed in engagement to display the completed image and hence the symbol. The celebration or observance, such as a memorial service or wedding dinner, then is conducted in the presence of the symbol formed by the plurality of boxes. The boxes are removed from engagement, rendering the image incomplete and so that the symbol is no longer formed. Each box is provided to a one of the persons as a keepsake of the event.

III. BRIEF DESCRIPTION OF THE DRAWINGS

Figure 26A:
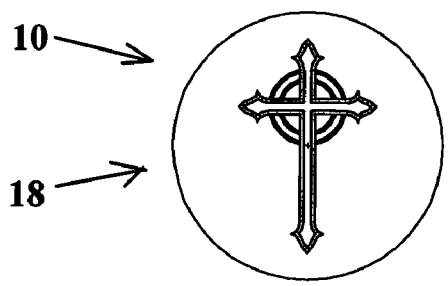
Figure 26:
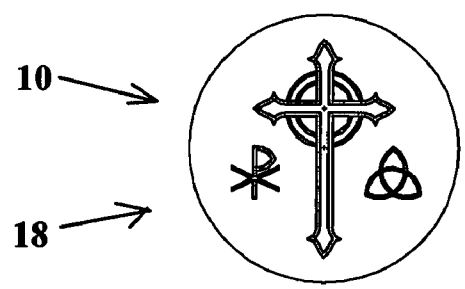
Figure 26C:
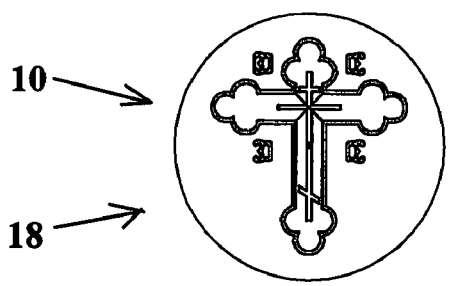
Figure 26:
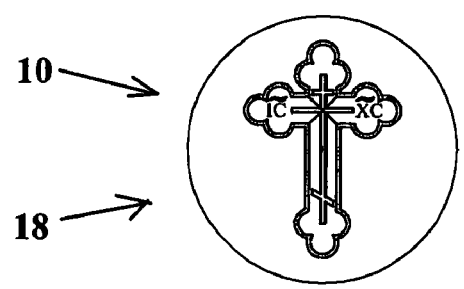
Figure 26:
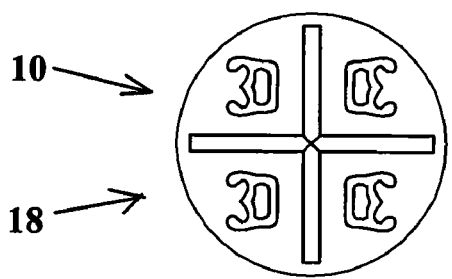
Figure 26F:
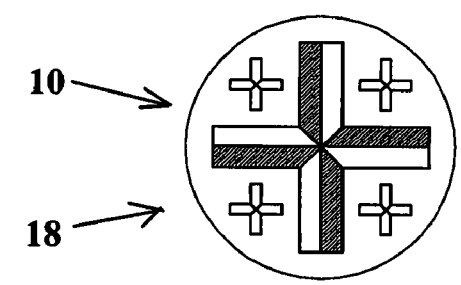
Figure 26G:
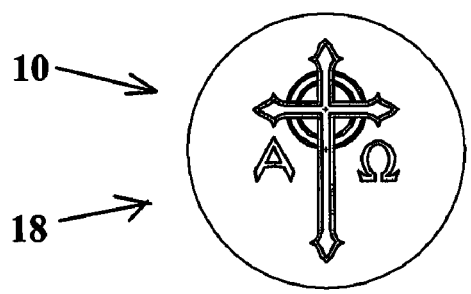
Figure 26H:
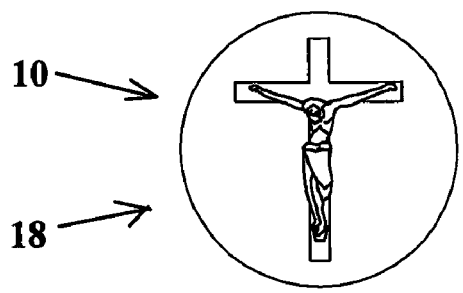
Figure 26I:
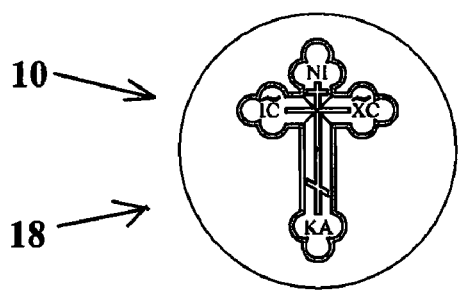
Figure 26J:
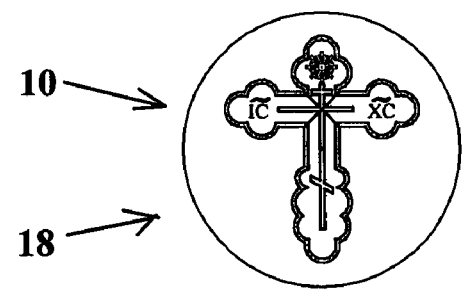
Figure 26K:
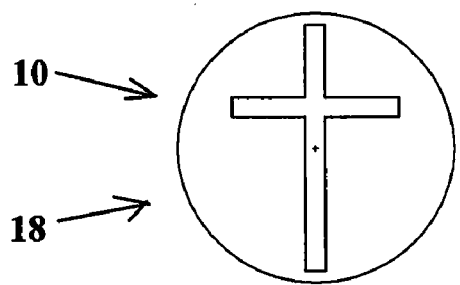
Figure 26L:
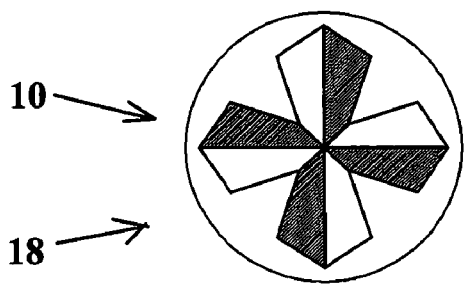
Figure 26M:
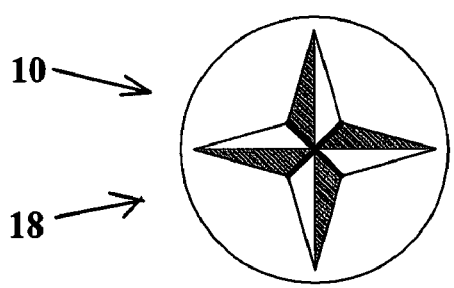
Figure 26N:
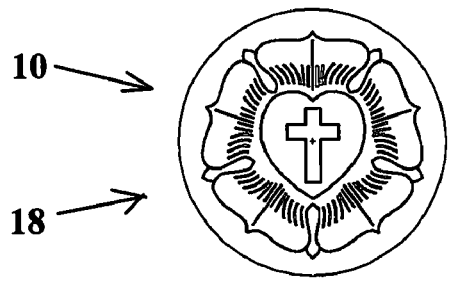
Figure 26O:
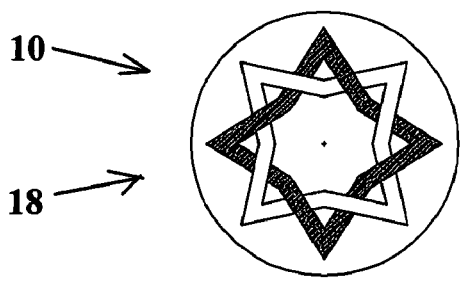
Figure 26P:
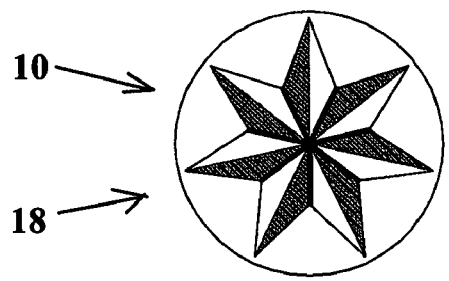
Figure 26Q:
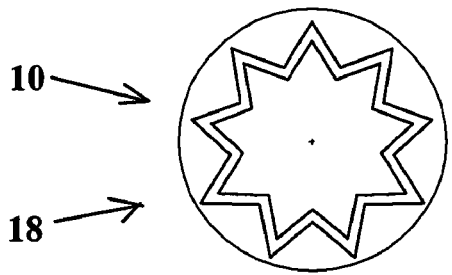
Figure 26R:
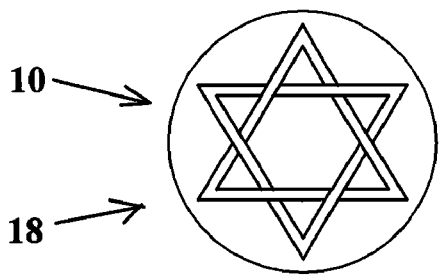
Figure 26S:
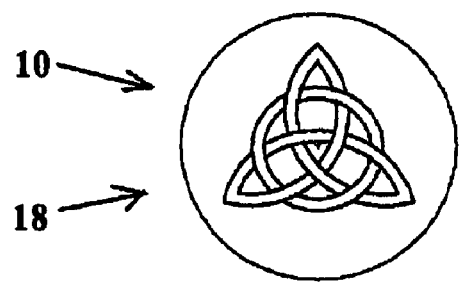
Figure 26T:
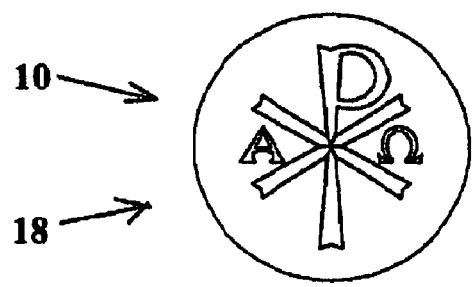
Figure 26U:
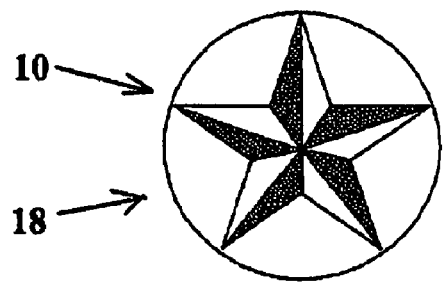
Figure 26V:
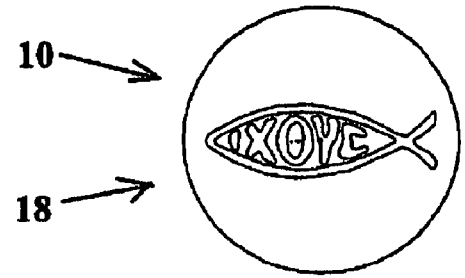
Figure 26A:
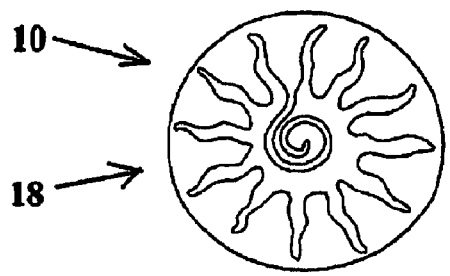
Figure 26A:
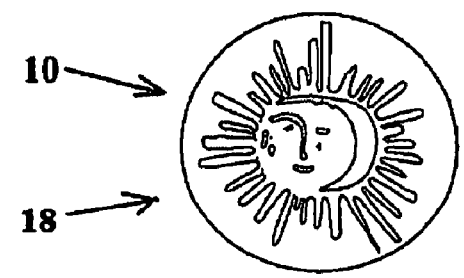
Figure 26W:
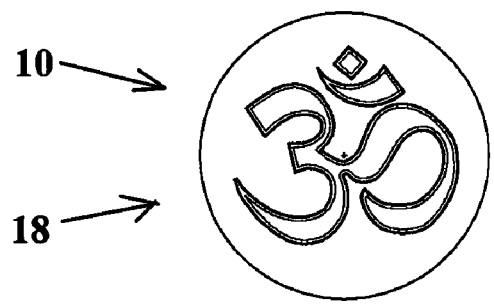
Figure 26X:
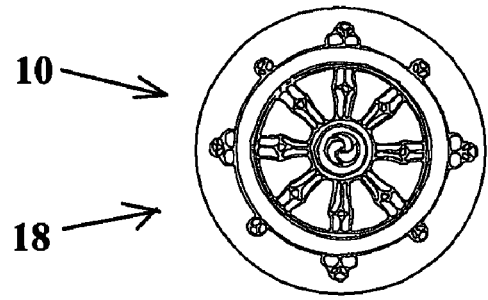
Figure 26Y:
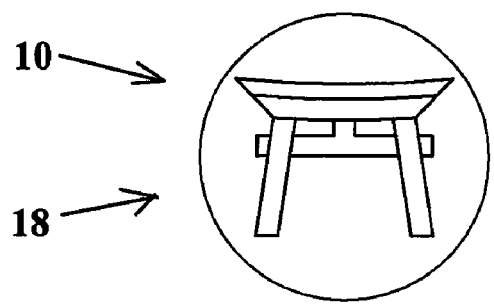
Figure 26Z:
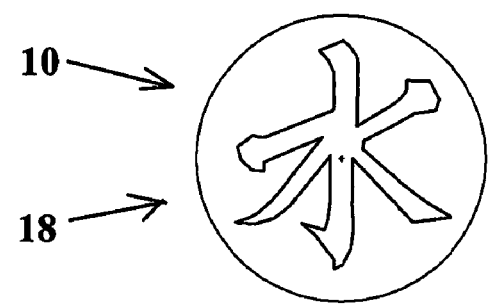
Figure 26A:
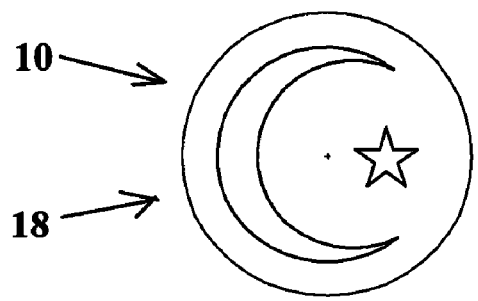
Figure 26A:
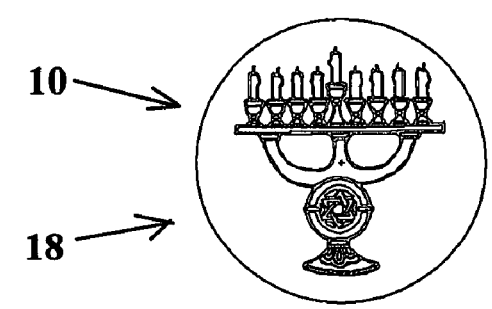

FIGS. 26A-26AD are religious symbols.

Figure 27:
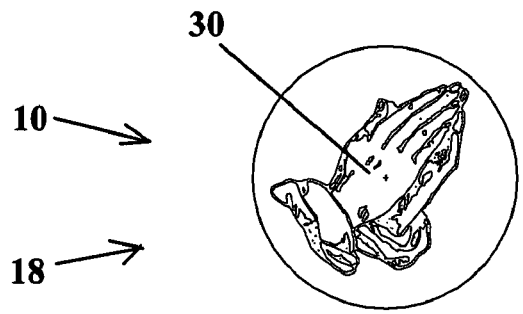

FIG. 27 is a religious image.

Figure 28:
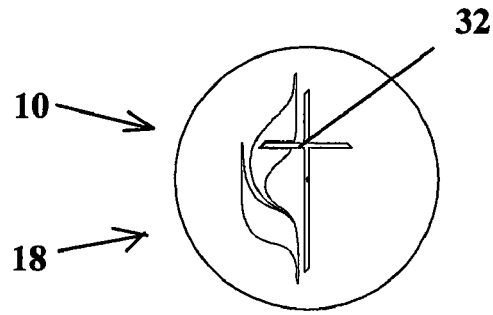

FIG. 28 are symbols in the form of a trademark or logo.

Figure 29:
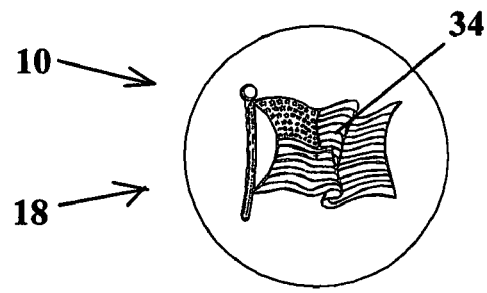

FIG. 29 is a symbol in the form of a flag.

Figure 30:
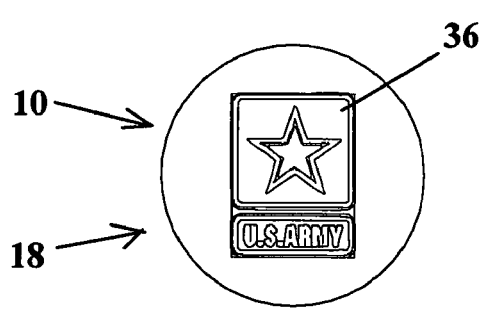

FIG. 30 is a symbol of a military organization.

Figure 31A:
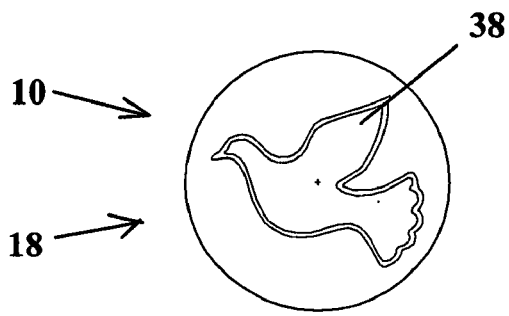
Figure 31B:
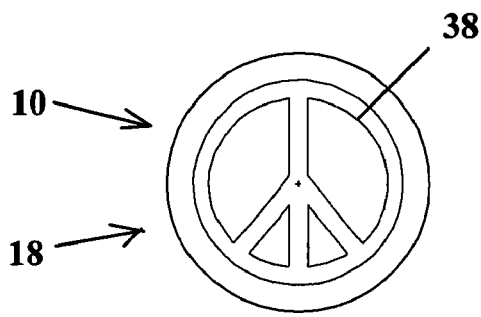

FIGS. 31A and 31B are political symbols.

Figure 32:
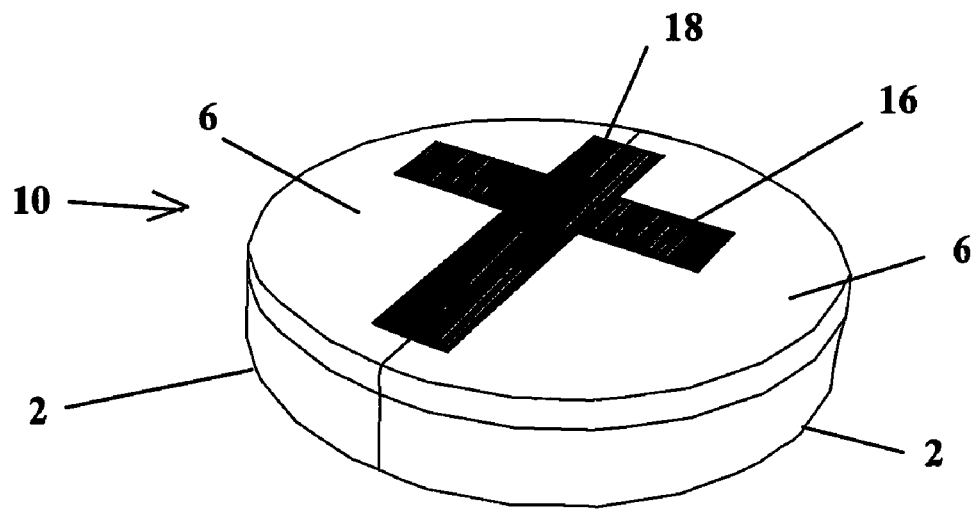

FIG. 32 is a perspective view of another embodiment displaying a symbol.

Figure 33:
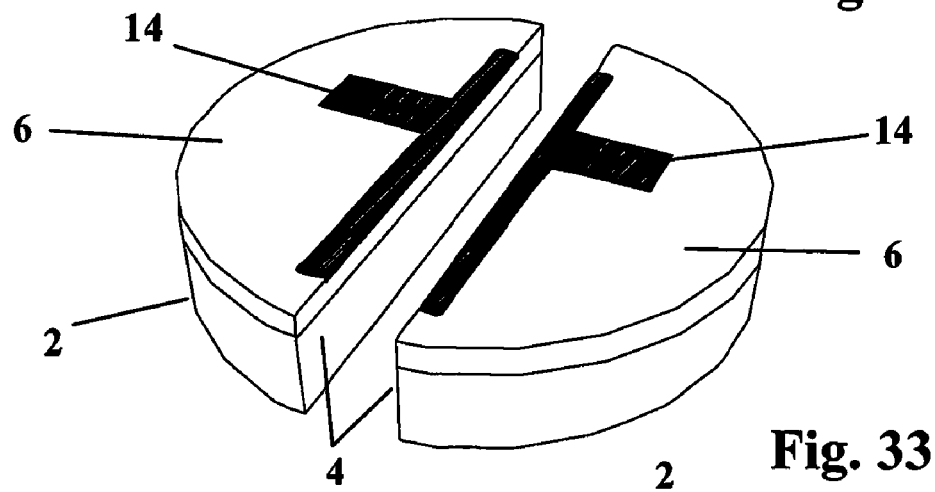

FIG. 33 is a perspective view of the embodiment of FIG. 32 with the boxes separated and not in engagement.

Figure 34:
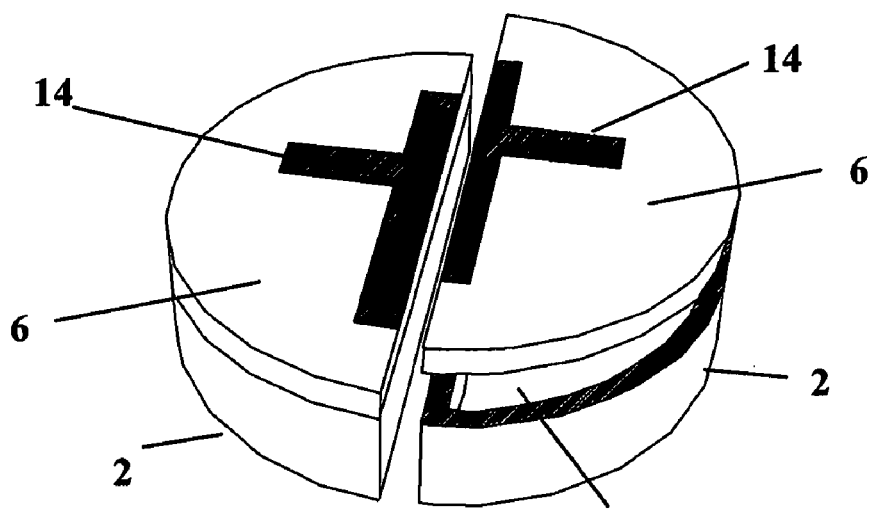

FIG. 34 is a perspective view of the embodiment of FIG. 32 with the boxes separated and one top removed.

Figure 35:
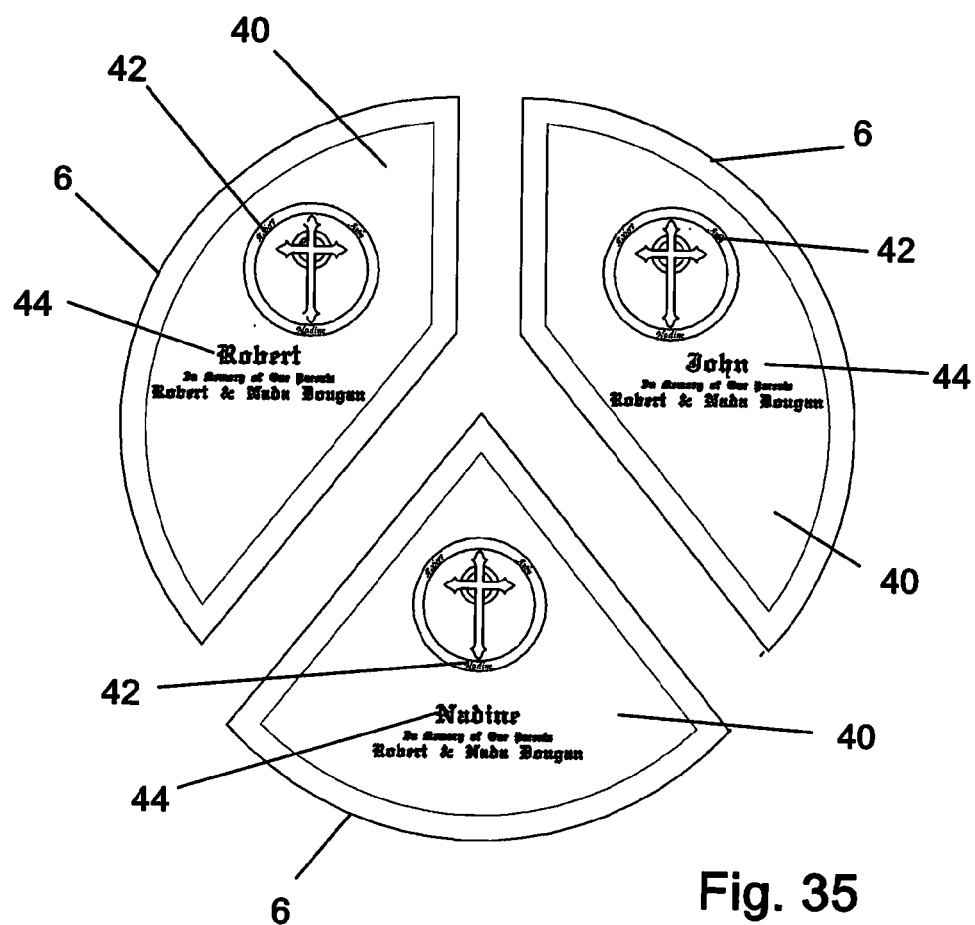

FIG. 35 is a view of the underside of the top of the embodiment of FIGS. 9 through 16.

IV. DESCRIPTION OF AN EMBODIMENT

Figure 4:
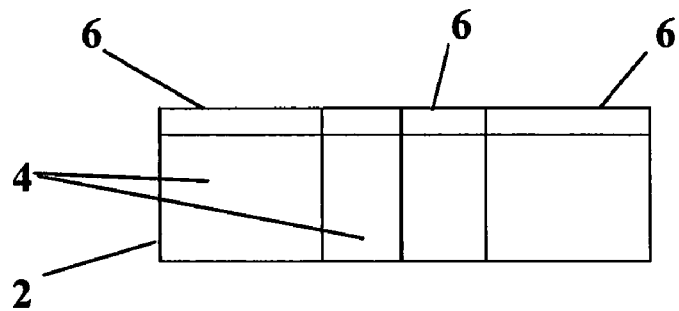
FIG. 4 is a side view of the plurality of boxes of FIG. 1.
Figure 5:
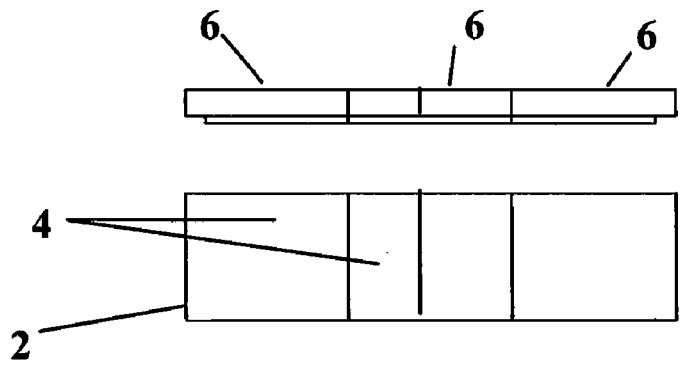
FIG. 5 is a side view of the plurality of boxes of FIG. 1 with tops removed.
Figure 6:
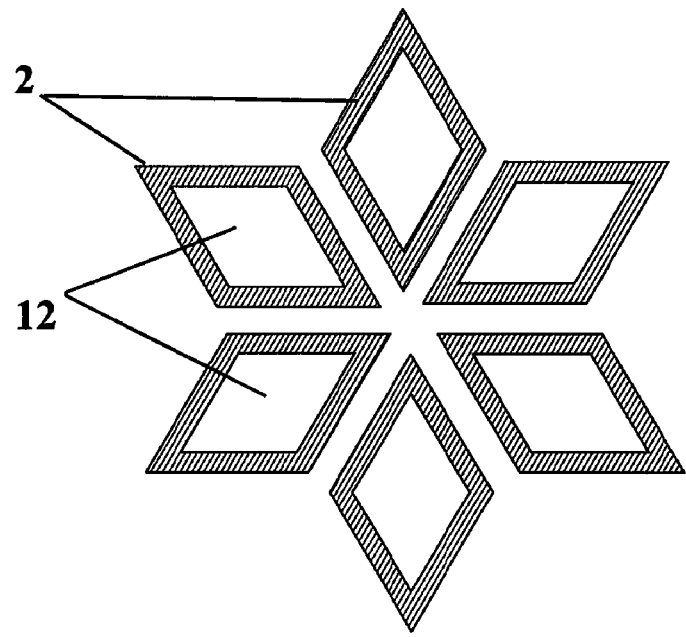
FIG. 6 is a top view of the plurality of boxes of FIG. 1 with the tops removed.

FIGS. 1-8 illustrate a first embodiment of the Invention. The first embodiment utilizes six boxes 2. Each of the six boxes 2 has a diamond shape in plan view, as illustrated by FIG. 6. Each of the boxes 2 has sides 4, top 6 and a bottom 8. For each of the six boxes 2, two of the sides 4 are configured to engage a side 4 of another box 2, so that each box 2 engages two other boxes 2.

Figure 1:
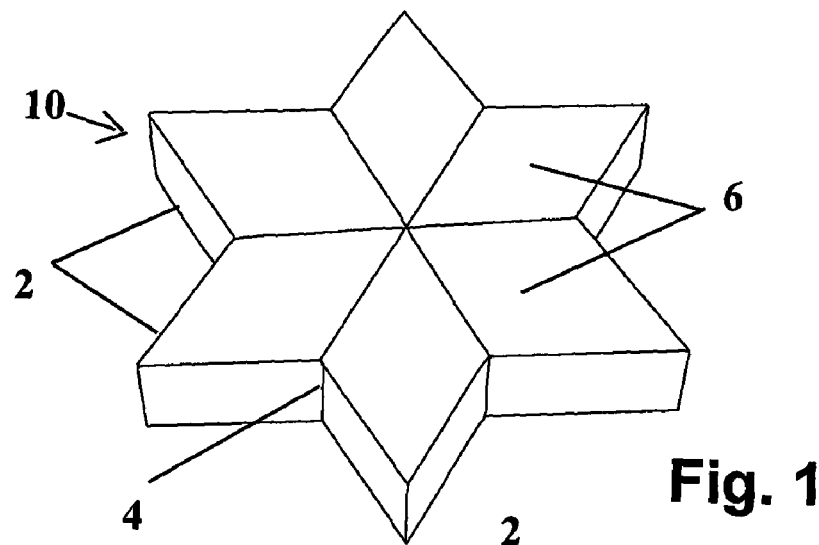
FIG. 1 is a perspective view of six boxes in engagement.
Figure 2:
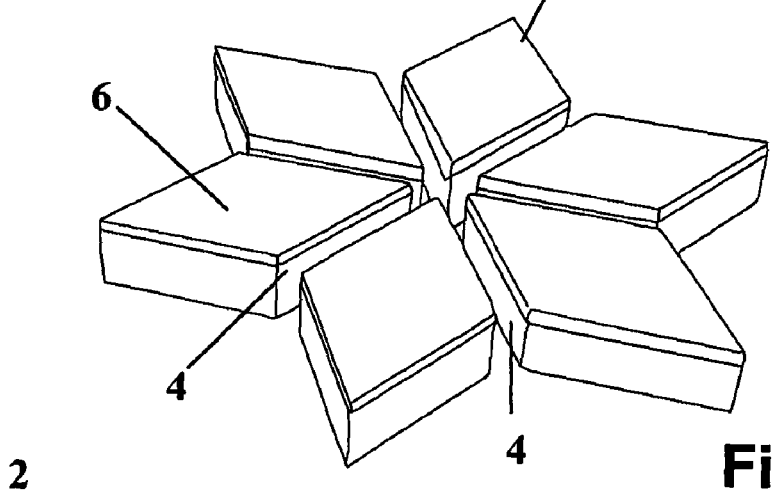
FIG. 2 is a perspective view of the boxes of FIG. 1 separated one from the other.
Figure 3:
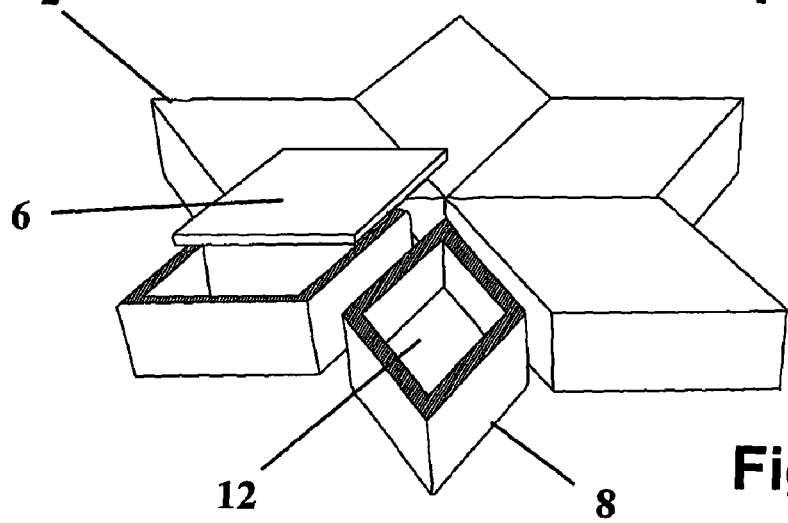
FIG. 3 is a perspective view of the plurality of boxes of FIG. 1 with tops of two boxes removed.

FIG. 1 illustrates the six boxes 2 with the sides 4 in engagement. When the sides 4 are in engagement, the six boxes 2 form a geometric solid 10, in this case a six-pointed star. FIG. 2 illustrates the six boxes 2 of the first embodiment with the sides 4 of boxes 2 not in engagement. FIG. 3 illustrates the partial assembly of the six boxes 2 into the geometric solid 10. In FIG. 3, two of the boxes 2 are not in engagement and are shown with tops 6 removed. As illustrated by FIG. 3, each box 2 defines an interior volume 12 that may be accessed by removing top 6.

FIGS. 4 and 5 are side views of the geometric solid 10 formed by assembly of the six boxes 2 of FIG. 1. FIG. 5 is a side view showing the tops 6 of the boxes 2 removed. FIG. 6 is a top view of the boxes 2 with tops 6 removed when the boxes 2 are not in engagement. FIG. 6 along with FIG. 3 illustrates the interior volume 12 defined by each box 2.

Figure 7:
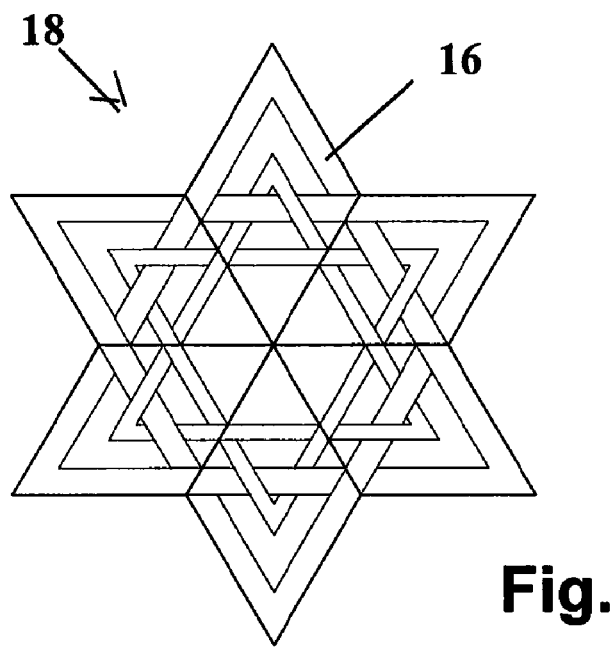
FIG. 7 is a top view of the plurality of boxes of FIG. 1 displaying a symbol.
Figure 8:
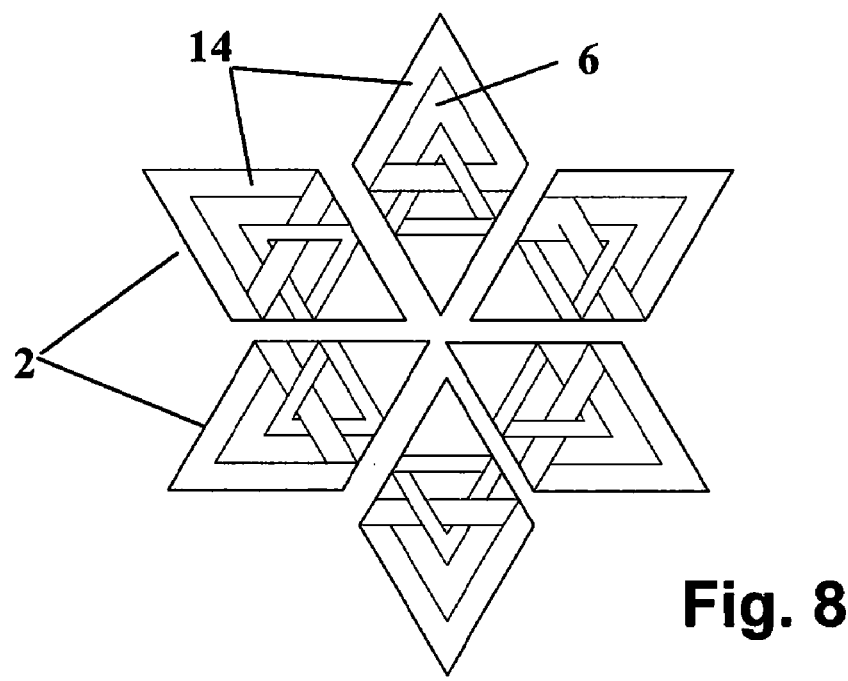
FIG. 8 is a top view of the plurality of boxes of FIG. 1 with the boxes separated and not in engagement.
Figure 9:
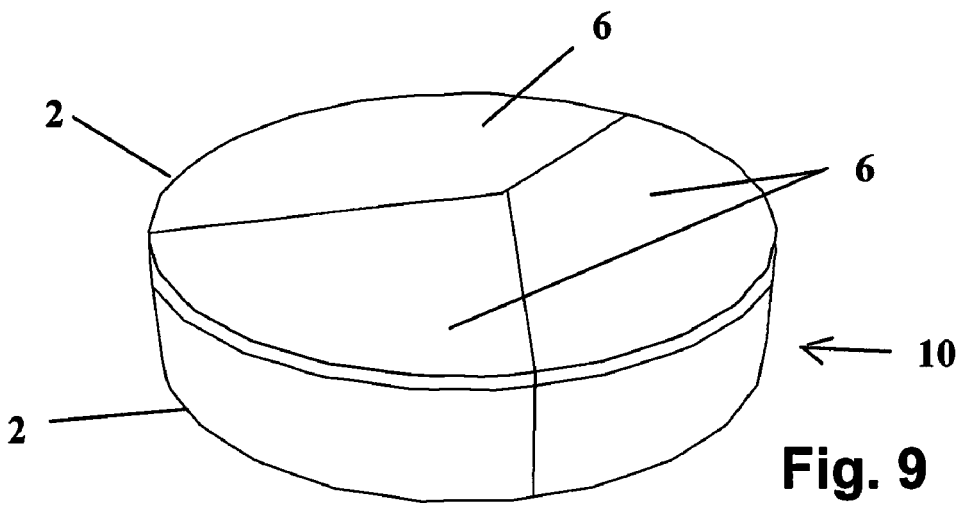
FIG. 9 is a perspective view of three boxes in engagement.
Figure 10:
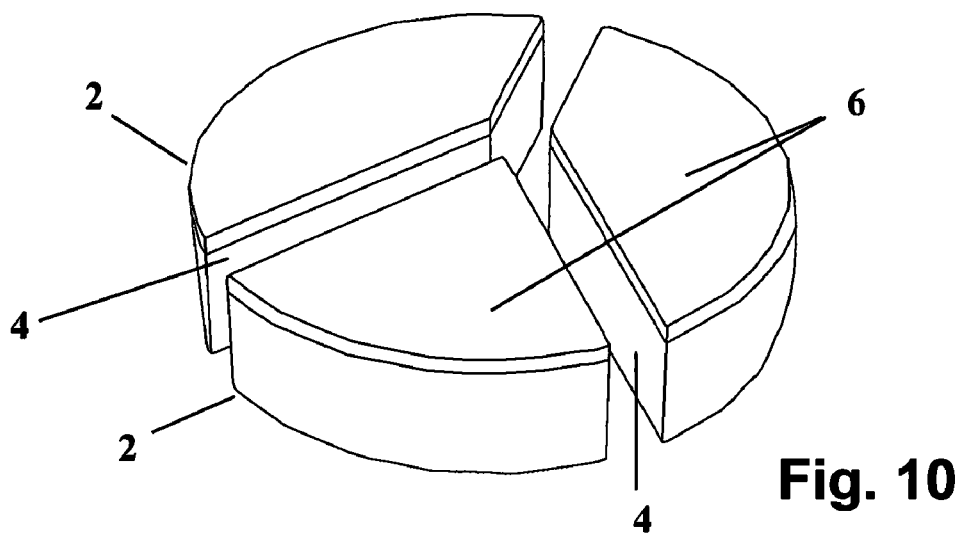
FIG. 10 is a perspective view of the boxes of FIG. 9 separated one from the other.

FIG. 8 illustrates the indicia 14 appearing on the top 6 of each box 2. As shown by FIG. 7, when the six boxes 2 are in engagement the indicia 14 on each box 2 cooperate to form a image 16, in this instance the Star of David religious symbol 16. If any box 2 is removed from engagement with the other boxes 2, the image 16 is interrupted and the symbol 16 is not complete.

Figure 11:
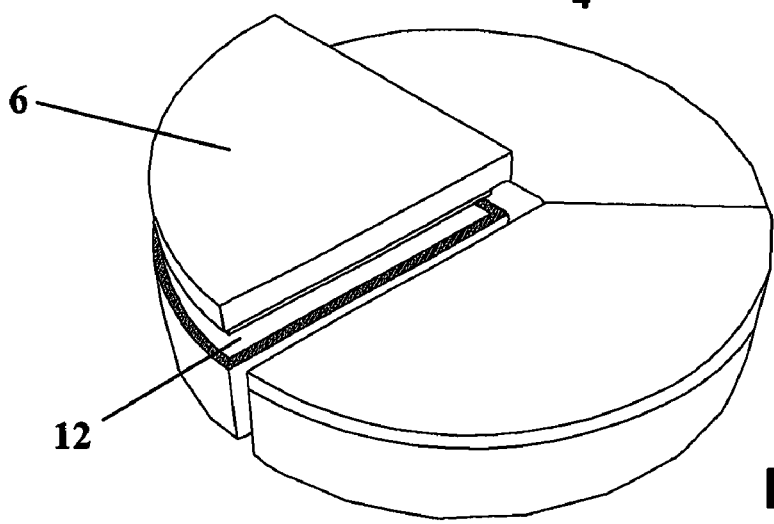
FIG. 11 is a perspective view of the plurality of boxes of FIG. 9 with tops of one box removed.
Figure 12:
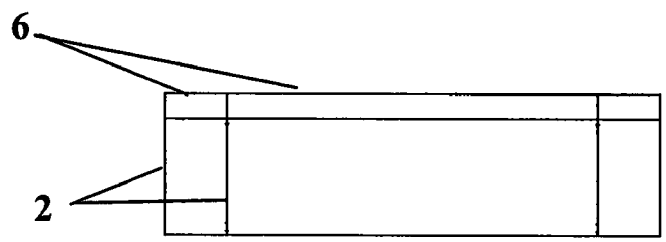
FIG. 12 is a side view of the three boxes of FIG. 9.
Figure 13:
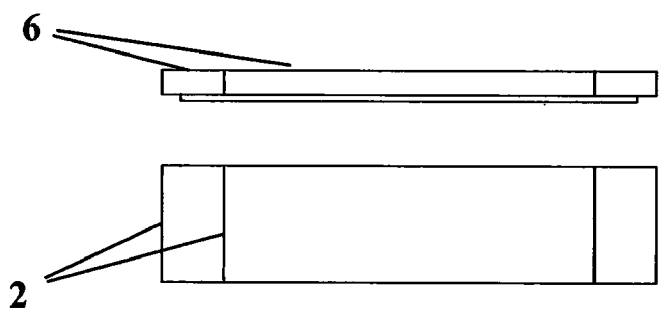
FIG. 13 is a side view of the three of boxes of FIG. 9 with tops removed.

FIGS. 9 through 16 illustrate a second embodiment of the Invention. As shown by the perspective views of FIGS. 9-11, the second embodiment utilizes three boxes 2, each of which is shaped like a pie slice in plan view. Each of two sides 4 of each box 2 engages a side 4 of another box 2. When the sides 4 of the boxes 2 are engaged, the three boxes 2 cooperate to form a geometric solid, in this case a cylindrical solid. FIGS. 12 and 13 are side views of the three boxes 2 assembled to form the cylindrical solid.

Figure 14:
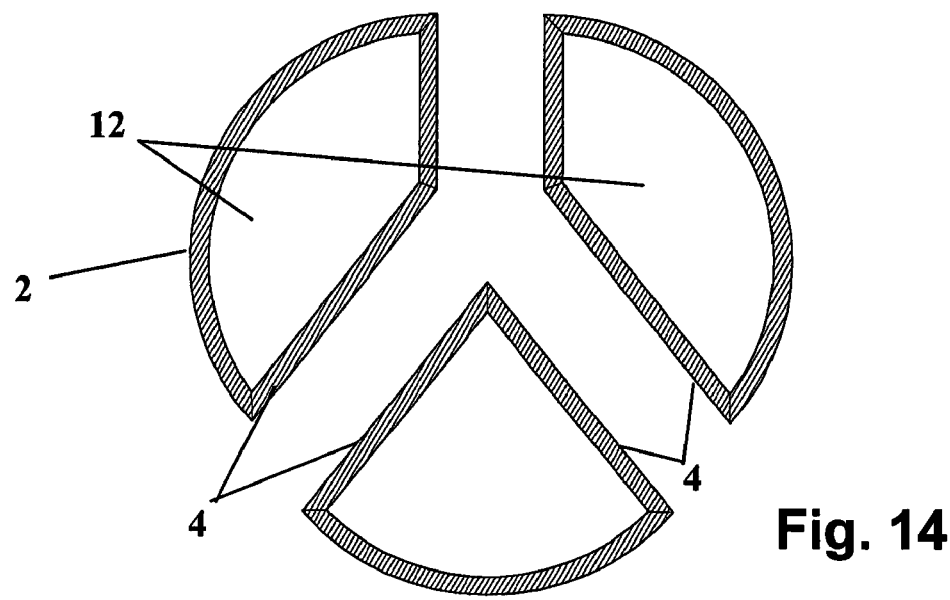
FIG. 14 is a top view of the three boxes of FIG. 9 with the tops removed.

Each box 2 has a removable lid, illustrated by FIGS. 11 and 13. FIG. 11 is a perspective view of the assembled geometric solid with the top 6 of one box 2 removed. FIG. 13 is a side view with the three tops 6 separated from the sides 4 of the boxes 2. FIG. 14 is a top view of the three boxes 2 with the tops 6 removed to show the interior volume 12 of the boxes 2. The boxes 2 of FIG. 14 are separated and do not form the geometric solid 10.

Figure 15:
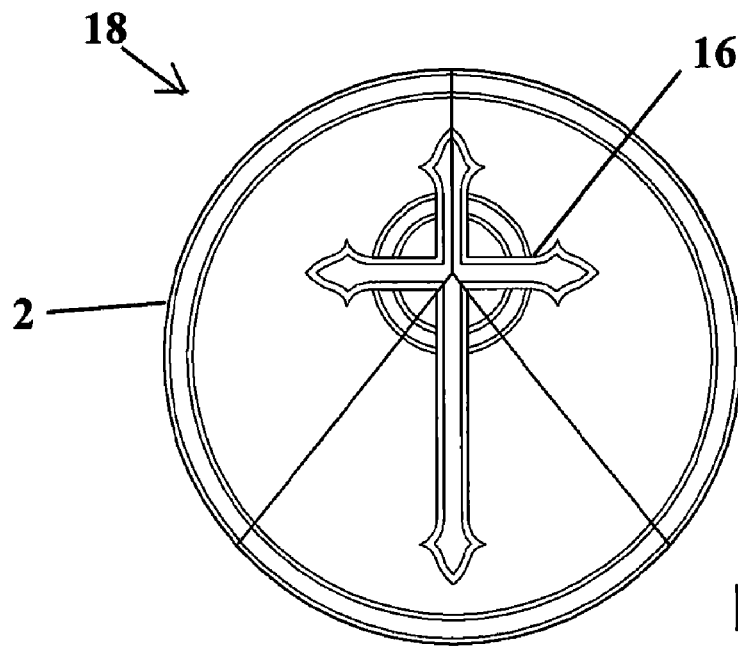
FIG. 15 is a top view of the plurality of boxes of FIG. 9 displaying a symbol.
Figure 16:
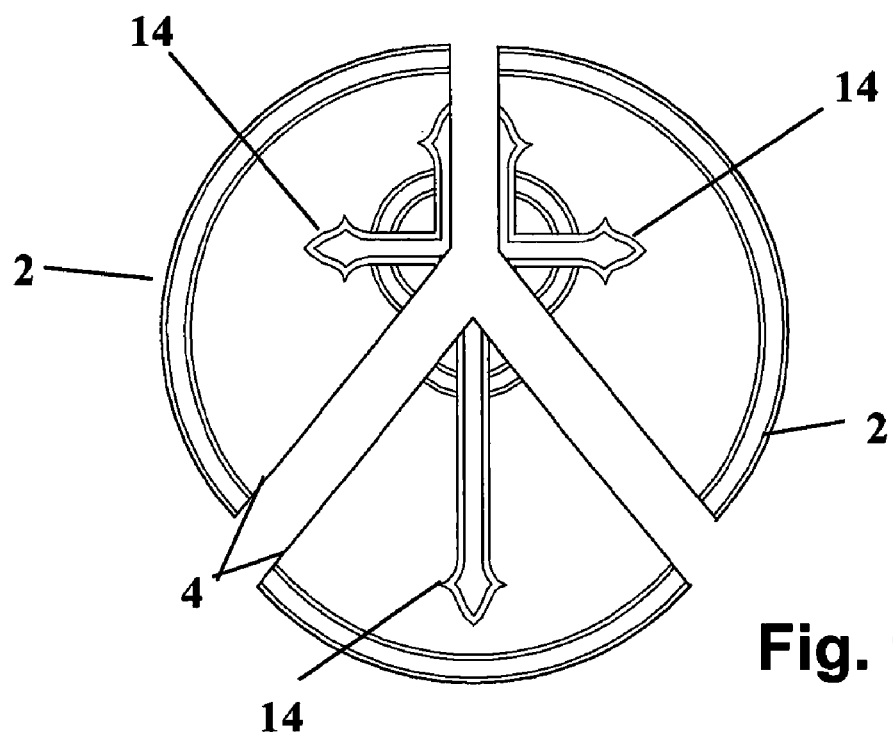
FIG. 16 is a top view of the three boxes of FIG. 9 with the boxes separated and not in engagement.

FIGS. 15 and 16 show indicia 14 on each of the boxes 2. When the boxes 2 are in engagement to form the complete geometrical solid, the indicia 14 cooperate to form the complete image 16 in this instance a Christian cross religious symbol 18. If any of the boxes 2 is not in engagement as illustrated by FIG. 16, the image 16 and hence the symbol 18 is incomplete.

Figure 17:
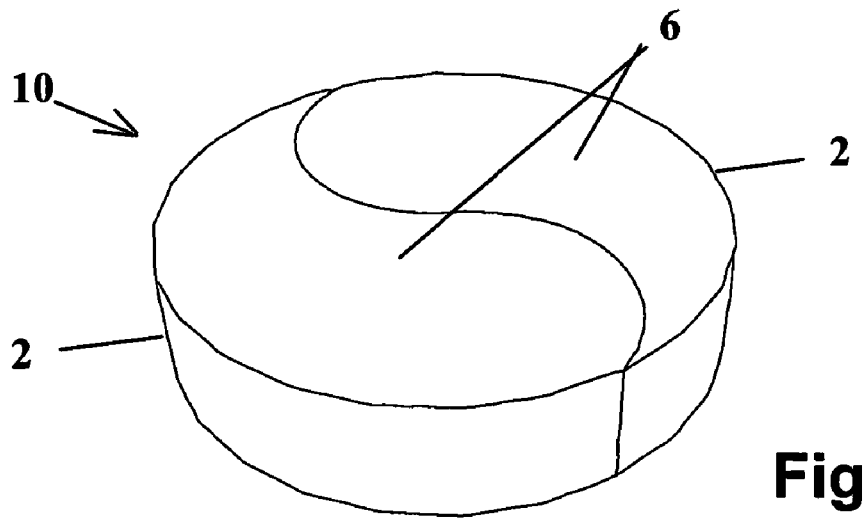
FIG. 17 is a perspective view of two boxes in engagement.
Figure 18:
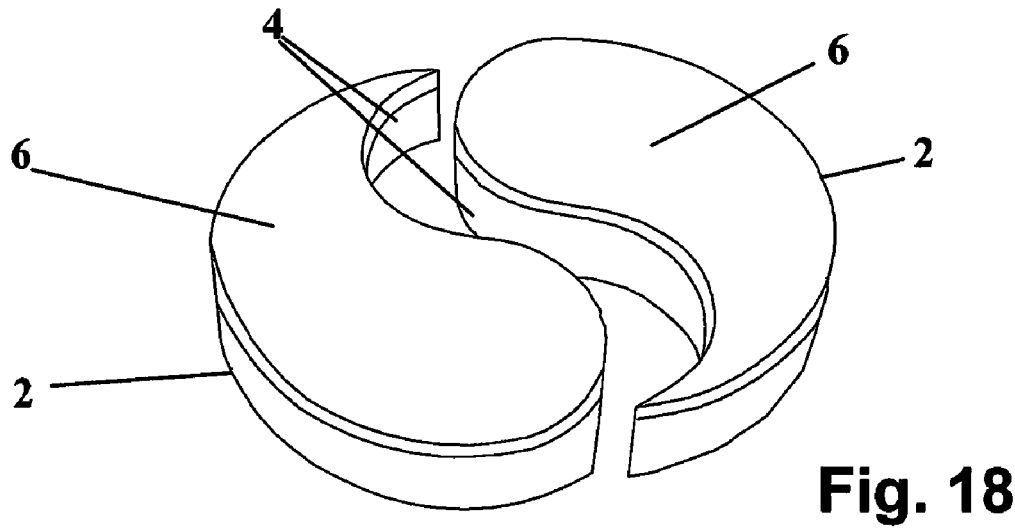
FIG. 18 is a perspective view of the boxes of FIG. 17 separated one from the other.
Figure 19:
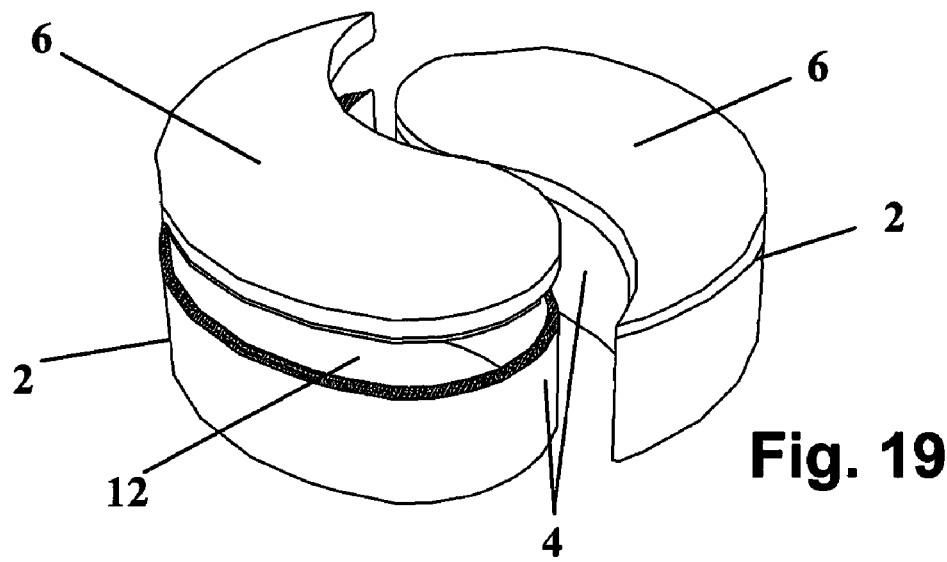
FIG. 19 is a perspective view of the two boxes of FIG. 9 with top of one box removed.
Figure 20:
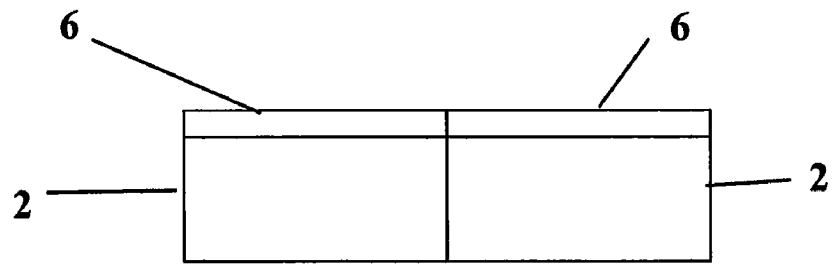
FIG. 20 is a side view of the two boxes of FIG. 17.
Figure 21:
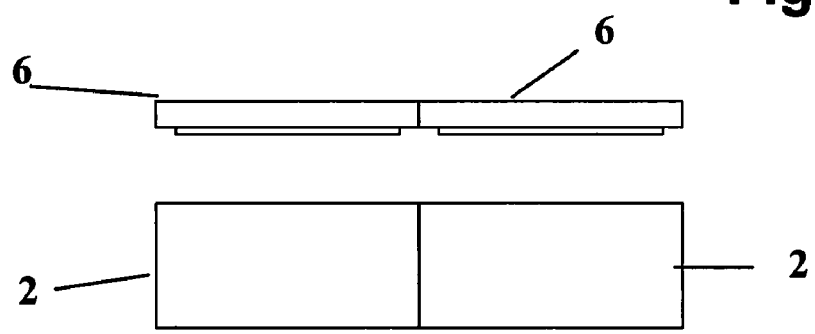
FIG. 21 is a side view of the two of boxes of FIG. 17 with tops removed.
Figure 22:
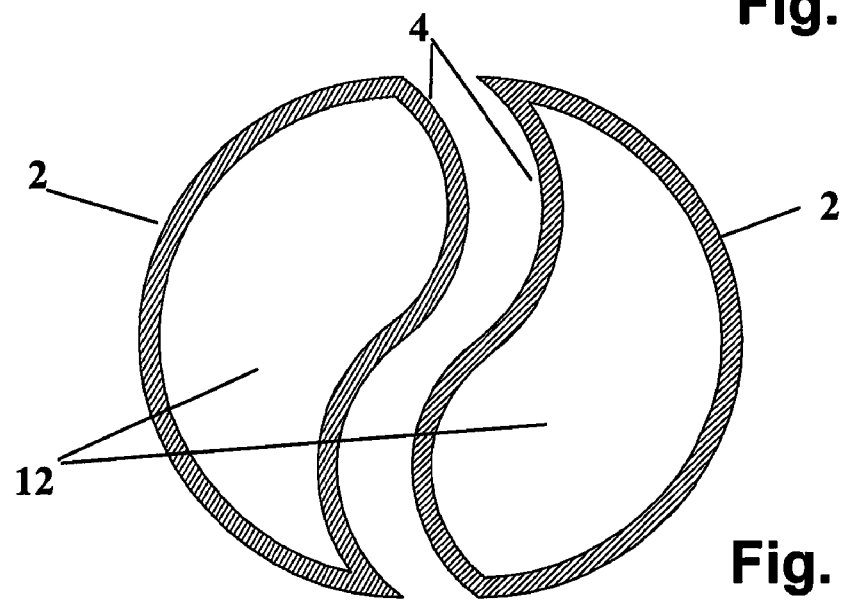
FIG. 22 is a top view of the two boxes of FIG. 17 with the tops removed.

FIGS. 17 through 24 illustrate a third embodiment of the Invention. In FIGS. 17 through 24, two boxes 2 are provided. Each of the two boxes 2 has a curved side 4 that selectably engages the corresponding curved side 4 of the other box 2. As shown by FIG. 17, when the sides 4 of the two boxes 2 are in engagement, the two boxes 2 form a geometrical solid 10, in this case a cylindrical solid. As shown by FIG. 18, when the mating sides 4 of the boxes 2 are not in engagement, the two boxes 2 do not form the cylindrical solid. Each of the boxes 2 has a removable top 6 and defines an interior volume 12, as shown by FIG. 19. FIGS. 20 and 21 are side views of the assembled boxes 2. FIG. 20 shows the boxes 2 with the tops 6 in place and FIG. 21 shows the assembled boxes 2 with the tops 6 removed. FIG. 21 is a plan view of the two boxes 2 with the tops 6 removed and the boxes 2 separated and not forming the cylindrical solid.

Figure 23:
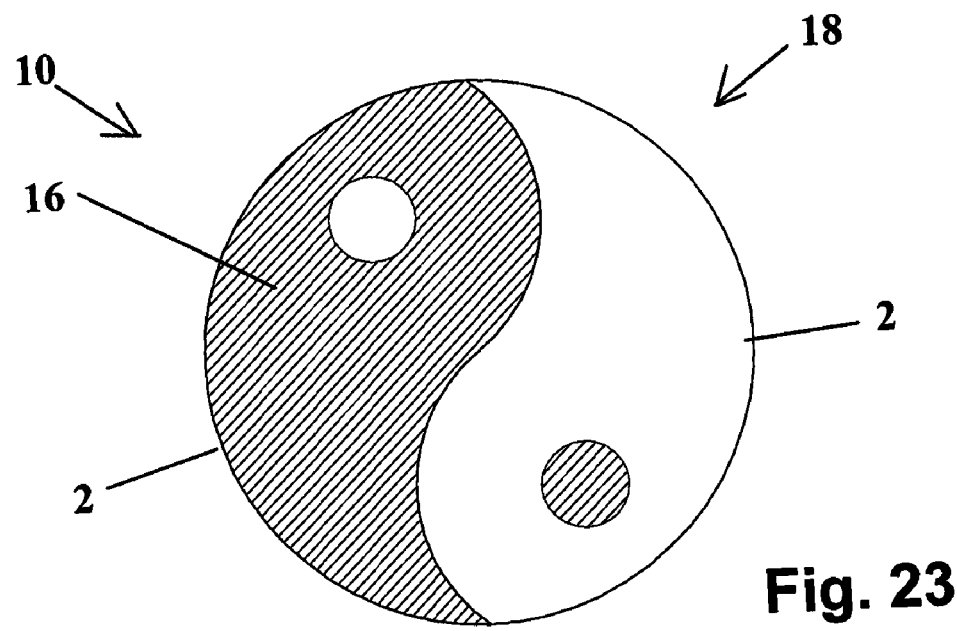
FIG. 23 is a top view of the two boxes of FIG. 17 displaying a symbol.
Figure 24:
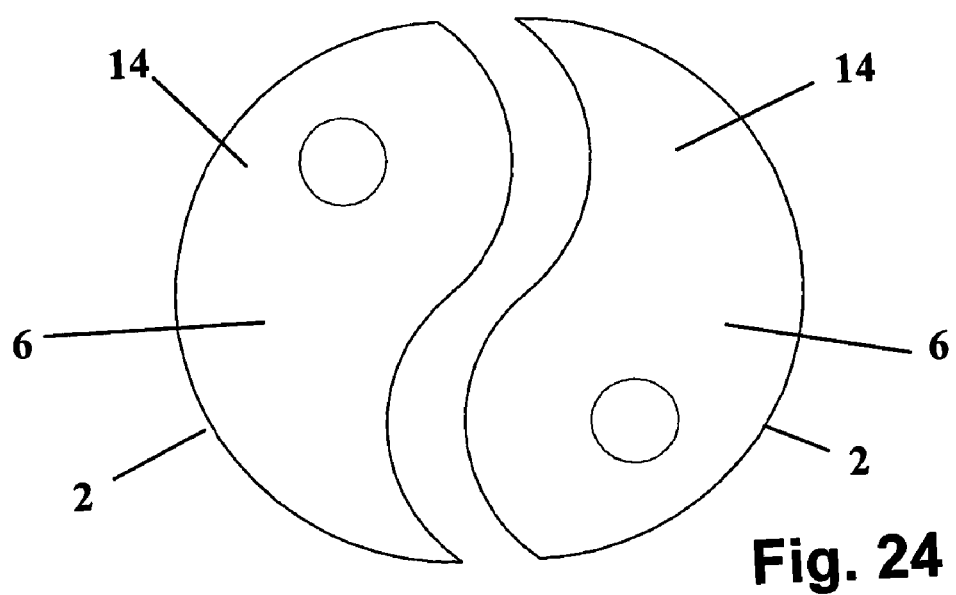
FIG. 24 is a top view of the two boxes of FIG. 17 with the two boxes separated and not in engagement.

FIGS. 23 and 24 show to the two boxes 2 of FIG. 17 in plan view and with the tops 6 bearing indicia 14. As shown by FIG. 23, the indicia 14 in this instance cooperate to form an image 16 of the Ying and Yan religious symbol 18 when the boxes 2 are in engagement. When the boxes 2 are separated, as shown by FIG. 24, the image 16 and hence the Ying and Yan religious symbol 18 is incomplete.

As discussed above relating to FIGS. 1-17, two, three or six boxes may be configured for engagement to create a composite image 16 from indicia 14 appearing on the top 6 of each box 2 and hence form symbol 18. The invention is not limited to two, three or six box embodiments and any number of boxes 2 may cooperate to form image 16 and symbol 18, provided that the number of boxes 2 is greater than 1.

Figure 25:
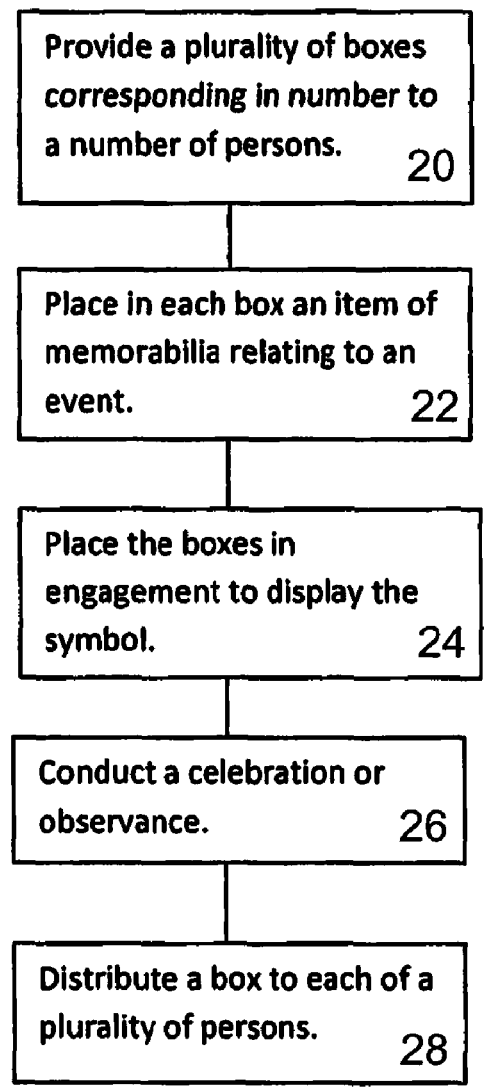
FIG. 25 is a flow chart of the method of the invention.

FIG. 25 is a flow chart of the method of the invention. The method utilizes the boxes 2 of the invention to observe or to celebrate an event. As indicated by step 20 of FIG. 25, two or more boxes 2 are provided. The number of boxes corresponds to the number of persons who will receive a box. The two or more boxes 2 each has one or more sides 4 that are configured to matably engage with corresponding sides 4 of at least one other of the boxes 2, as described in the preceding paragraphs. Indicia 14 appear on the tops 6 of the two or more boxes 2. When the sides 4 of the boxes 2 are matably engaged, the two or more boxes 2 form a geometric solid 10 and the indicia 14 on the tops 6 of the boxes cooperate to form an image 16. The image is a symbol 18. If any of the boxes 2 is not in engagement with the other boxes 2, the image 16 is incomplete and hence the symbol 18 is not formed.

As shown by step 22, memorabilia related to the event is placed in the interior volume 12 of each of the two or more boxes 2. The two or more boxes 2 are placed in engagement so that the indicia 14 appearing on the tops 6 of the boxes 2 display the complete image 16 and hence form the symbol 18, as indicated by step 24 of FIG. 25. As illustrated by step 26, a ceremony or observance of the event is conducted in the presence of the two or more boxes 2 in engagement and displaying the symbol 18. The two or more boxes 2 are subsequently separated, rendering the image 16 incomplete. The symbol 18 is not formed by the separated boxes 2. The two or more boxes 2, each containing the items of memorabilia, are distributed to two or more persons, as illustrated by step 28 of FIG. 25.

FIGS. 26A through 26AD illustrate religious symbols 18 that may be formed by the image 16 that is completed by the indicia 14 appearing on the tops 6 of the two or more boxes 2 when the two or more boxes 2 are placed in engagement. The symbols illustrated by FIGS. 26A through 26AD are not exhaustive and any religious symbol 18 is contemplated by the Invention.

FIG. 27 illustrates that the symbol 18 may be a religious image 30, as an image of a person engaged in religious observance or an image of a person or deity. FIG. 28 illustrates that the symbol 18 may be an organization symbol, such as a trademark or logo 32. In the example of FIG. 28, the organization symbol is a registered trademark of the United Methodist Church. FIG. 29 illustrates that the symbol 18 may be a representation of a flag 34, such as a national flag, a flag of a military or other organization or a flag of a police or fire department. FIG. 30 illustrates that the symbol may be a patriotic, military, police or fire organization symbol 36. FIGS. 31A and 31B illustrate that the symbol 18 may be a political symbol 38, indicating a political organization, movement or point of view. The illustrated symbols 18 are not exhaustive and the symbol 18 may be any symbol 18.

FIGS. 32 through 34 illustrate another embodiment having two boxes 2. Boxes 2 have tops 6 and define interior volumes 12. Indicia 14 appear on the top 6 of each box 2, as shown by FIGS. 33 and 34. At least one side 4 of each box 2 is configured to matably engage with at least one corresponding side 4 of the other box 2. When the sides 4 are in matable engagement, the indicia 14 cooperate to form the complete image 16. The image 16 is a symbol 18, in this instance a Christian cross. When the at least one side 4 of each box 2 is not in engagement with the corresponding side 4 of the other box 2, the image 16 is not complete and the symbol 18 is not formed.

FIG. 35 illustrates the underside 40 of top 6 of the embodiment of FIGS. 9 through 16. The underside 40 of top 6 includes a depiction of the symbol 18, which is the same symbol 18 defined by composite image 16 when the plurality of boxes 2 are in engagement. Underside 40 also includes a location identifier 42 indicating the location of the particular box 2 in the plurality of boxes 2 when the boxes 2 are in engagement to form image 16 and hence symbol 18. Underside 40 also includes a name identifier 44. Name identifier 44 provides the name of each person to whom a box 2 is provided from the plurality of boxes 2. The name of each person receiving a box 2 also may appear as the location identifier 42 of each box, so that each person receiving a box 2 can identify where the person's box 2 would fit into the plurality of boxes 2 when the boxes 2 are in engagement and can identify each other person receiving a box 2.

List of elements: The following is a list of elements appearing in the claims, generally in the order in which those elements appear:

| | |
|---|---|
| A plurality of boxes | 2 |
| a bottom | 8 |
| a side | 4 |
| a top | 6 |
| an interior volume | 12 |
| a geometric solid | 10 |
| indicia | 14 |
| an image | 16 |
| a symbol | 18 |
| a religious symbol | 18 |
| a religious image | 30 |
| An organization symbol | 32 |
| a patriotic, military, police or fire organization symbol | 36 |
| a flag | 34 |
| a political symbol | 38 |
| an underside | 40 |
| location identifier | 42 |
| name identifier | 44 |

I claim:

1. A method of commemorating an event, the method comprising:
    a. providing a plurality of boxes, each of said plurality of boxes having a bottom, a side and a top and defining an interior volume, each of said plurality of boxes having at least one side that is configured to matably engage said at least one side of at least one other of said plurality of boxes, said plurality of boxes cooperating to form a geometric solid when said at least one side of each of said plurality of boxes is in engagement with said at least one side of said at least one other of said plurality of boxes, said top of each of said plurality of boxes bearing indicia, said indicia being visible to an observer located above said plurality of boxes, said indicia on said top of each of said boxes cooperating with said indicia on said top of each other of said plurality of boxes to form an image when said at least one side of each of said plurality of boxes is in engagement with said at least one side of said at least one other of said plurality of boxes, said image forming a symbol, said image being incomplete and said symbol not being formed when said at least one side of any one of said plurality of boxes is not in said engagement with said at least one side of another of said plurality of said boxes;
    b. placing an item of memorabilia relating to the event in said interior volume of each of said plurality of boxes;
    c. placing said at least one side of each of said plurality of boxes into engagement with said at least one side of at least one other of said plurality of boxes to form said geometric solid, to complete said image and to form said symbol;
    d. conducting a ceremony observing the event in the presence of said geometric solid displaying said image and forming said symbol;
    e. separating said plurality of boxes and distributing a one of said boxes containing said item of memorabilia to each of a plurality of persons.

2. The method of claim 1 wherein said indicia are flush with said top of each said box.

3. The method of claim 1 wherein said geometric solid is bilaterally symmetrical, each of said plurality of boxes is composed of a wood and said indicia are inlaid into said top of each said box.

4. The method of claim 1 wherein said top of each said box has an underside, said underside of each said box displaying said symbol.

5. The method of claim 1 wherein said top of each said box has an underside, said underside of each said top bears a location identifier, said location identifier specifying a location of said box in said plurality of boxes when said plurality of boxes are in engagement, said underside of each said box bearing a name identifier, said name identifier providing an identity of a person provided with each of said plurality of boxes.

6. The method of claim 1 wherein said symbol is a Christian cross.

7. The method of claim 1 wherein said symbol is a Star of David.

8. The method of claim 1 wherein said symbol is a Ying and Yan symbol.

9. The method of claim 1 wherein said symbol is a Muslim star and crescent.

10. The method of claim 1 wherein said symbol is a trademark or logo.

11. The method of claim 1 wherein said symbol is a one of a U.S. Marine Corps globe and anchor symbol, a U.S. Coast Guard crossed anchors symbol, a U.S. Army star symbol and a U.S. Air Force winged star symbol.

12. The method of claim 1 wherein said symbol is an image of a flag.

\* \* \* \* \*